United States Patent
Barbieri

[11] 3,880,519
[45] Apr. 29, 1975

[54] PROCESS AND APPARATUS FOR THE PREFILTERING AND FOR EXPOSURE INTERRUPTION IN ENLARGING APPARATUS

[75] Inventor: Siegfried Barbieri, Brixen, Italy

[73] Assignee: Durst AG Fabrik Fototechnischer Apparate, Bozen, Italy

[22] Filed: Sept. 20, 1973

[21] Appl. No.: 399,050

[30] Foreign Application Priority Data
Sept. 22, 1972 Italy .............................. 29541/72

[52] U.S. Cl. .................. 355/36; 355/38; 355/77; 355/88
[51] Int. Cl. ............................................ G03b 27/76
[58] Field of Search .............. 355/35, 36, 38, 88, 77

[56] References Cited
UNITED STATES PATENTS

| | | | |
|---|---|---|---|
| 3,049,051 | 8/1962 | Debrie | 355/35 |
| 3,077,140 | 2/1963 | Simmon et al. | 355/35 |
| 3,107,578 | 10/1963 | Engelage | 355/36 |
| 3,516,740 | 6/1970 | Clapp | 355/36 |
| 3,580,155 | 5/1971 | Zahn et al. | 355/36 X |
| 3,661,458 | 5/1972 | Noemer et al. | 355/36 X |
| 3,754,824 | 8/1973 | Weisglass et al. | 355/35 |

*Primary Examiner*—Richard A. Wintercorn
*Attorney, Agent, or Firm*—Connolly & Hutz

[57] ABSTRACT

Three glass color filters suitable for terminating the exposure of each of the three primary colors are mounted in rocking levers urged out of the path of the light beams by springs. Adjustable thrust rods operated by rotatable calibrated cam plates operatively contact the rocking levers to regulate the amount of their insertion into the light rays. Their amount of partial insertion is adjusted in accordance with the degree of primary filtering of the light rays desired during the exposure. Overdriving rotary magnets are connected to each of the rocking levers for fully inserting them into the path of the light beams when the desired amount of each of the primary colors has been obtained in the exposure for terminating the exposure to that primary color. After the exposure to the three primary colors are completed, the springs move the rocking levers back against the adjustable thrust rods in preparation for the next exposure.

10 Claims, 3 Drawing Figures

PROCESS AND APPARATUS FOR THE PREFILTERING AND FOR EXPOSURE INTERRUPTION IN ENLARGING APPARATUS

BACKGROUND OF THE INVENTION

The invention relates to a process and apparatus for the continuous prefiltering and for the exposure interruption in enlarging apparatus used in copying operations of color negatives.

In such copy work it is required to undertake a so-called primary filtering by means of yellow-purple and blue-green filters in order to equalize processing inequalities in the individual layers of the photo-sensitive material and in order to compensate for the inequalities of the optical media, the light source for example, of the diffusing disk and the optics used.

Furthermore, it is necessary to provide in enlargers means for copy work of color negatives which, after a sufficient exposure of the respective photo-sensitive layer, interrupt the respective basic light beams blue, green or red (primary colors).

It is known to employ gelatin filters calibrated in various color depth gradations for the execution of the primary filtering in copy work of color photographs and, according to need, to insert into the path of rays of the copy light more or less strongly colored filters. The stated gelatin filters have the disadvantage, however, that they are expressly heat-sensitive and that their calibrated coloration fades strongly in time. Noticeable faults in copying operations set in, therefore, in the course of time, since the stated color values of the filters are no longer true. For this reason, it is necessary often to recalibrate the primary filtering in the device using a test copy or to replace the entire set of gelatin filters.

It is further known to udertake the interruption of the primary light beams by respective suppression filters, which are flipped into the copying light beam as soon as the corresponding quantity of color light of one of the three primary colors has achieved its desired value. The suppression filters' transparency is arranged so that the filters completely suppress the particular primary color and let the other two primary colors pass through unhindered. It does not matter in this connection if they absorb or reflect the basic color. In color photography, filters in the colors yellow, purple and blue-green are preferred. In such previously known arrangements, the individual filters are situated in their resting position completely outside the beam of the copy light, while in the working position of the said suppression filters, the light beam emanating from the copy light source is completely covered for the suppression of a certain primary color.

The object of the present invention is to provide an enlarging apparatus for copy work of color photographs, wherein the special preliminary or primary filters may be completely omitted and the remaining filters may be used both preliminary or as primary filters as well as automatically controlled suppression filters.

SUMMARY

The solution to this problem is achieved according to the invention by a process for the continuous prefiltering and exposure interruption in enlarging apparatus for copying operations of color photographs, which is characterized in that individually and partially each of the three color filters is inserted into the path of rays of the copying light source until a desired primary filtering degree is reached and in this position is secured by stopping means; that after sufficient exposure of the individual light-sensitive layers pertaining to certain primary colors, the respective filters, for a color suppression, completely cover the light beam emanating from the copying light source, and after a complete exposure of all light-sensitive layers, all filters return to their starting position corresponding to the primary filtering.

The invention also encompasses a filter arrangement suitable for the execution of this process. In an advantageous embodiment of this arrangement, each filter is accomodated in a spring-loaded rocking lever, which may be swung about a point of rotation by means of a longitudinally movable pushrod (or adjustable thrust means) for the setting of the basic filtering position, the pushed rod being in operating contact with a cam plate, which may be rotated by suitable means. The spring members of the rocking lever supporting the filter are arranged in such a manner that they constantly take care of holding the rocking lever in its resting position set by the longitudinally moving rod.

In addition, it is suitable that each rocking lever be provided with an overdrive such as a rotary magnet, rotary electric motor or rotary electro-magnetic means for example, for the purpose of moving from its resting position into the suppression position. In accordance with a preferred design, a control circuit is provided for the activation of each individual rotary magnet or rotary electric motor, the circuit consisting of a photo-electric unit for the measuring of light intensity of a certain light color, whose signal corresponding to the light intensity is placed at the input of an amplifier, which feeds the input of an accumulator, which in turn is connected with an electronic limit value switch activating a switch relay for actuating the rotary magnet upon reaching a predetermined value.

The advantages achievable with the invention mainly consist of making it possible to use a single arrangement, which may be employed both for primary filtering as well as for exposure interruption, in place of the numerous, heat-sensitive gelatine filters for the primary filtering and of the device for exposure interruption.

A further advantage of the subject matter of the invention is that each filter may always be positioned in a simple and quick manner for the primary filtering and thus allows a satisfactory, qualitatively precise operation in copying work of color photographs. In addition, the novel device is expecially insensitive to disturbances because of its simple construction.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENT

Figure 1:
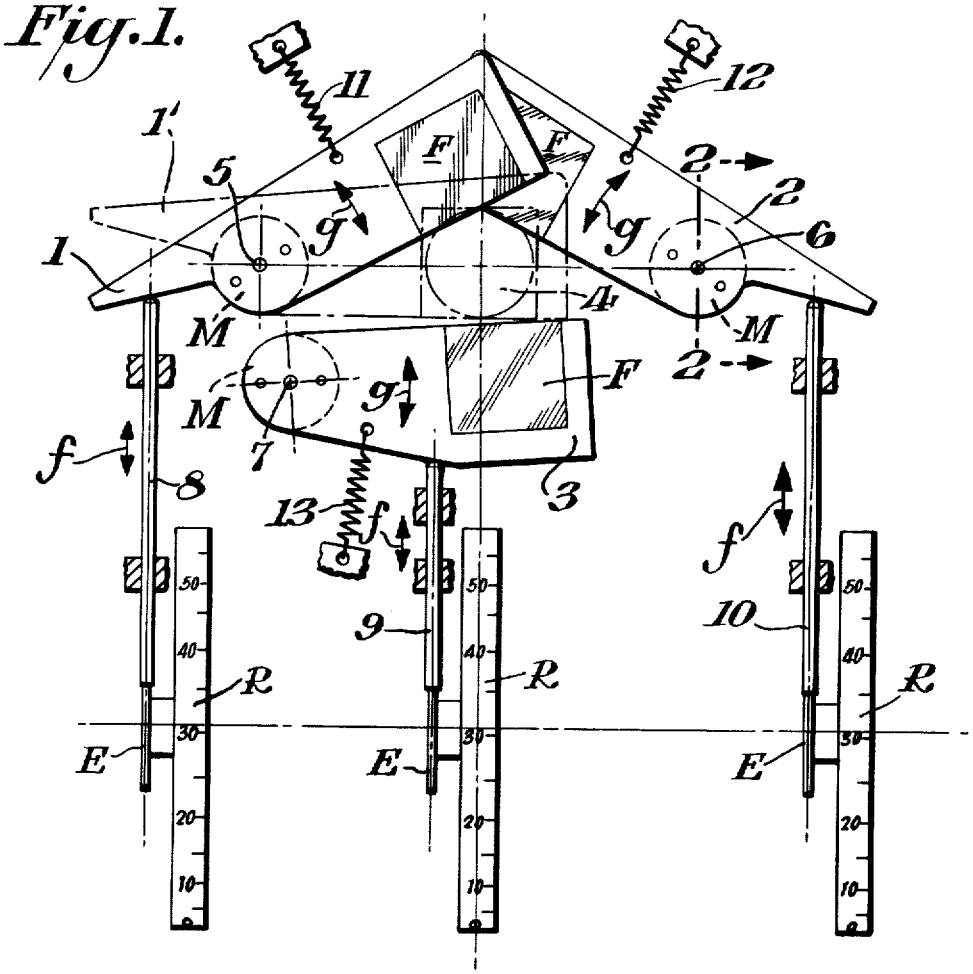
FIG. 1, a schematic illustration of the filter arrangement as well as the adjusting members required for the primary filtering of one embodiment of this invention.

The filter arrangement illustrated in FIG. 1 includes three rocking levers 1, 2 and 3, which rock in a plane lying normally to the path 4 of the light beam on respective points or rotation 5, 6 and 7. On the side of each rocking lever facing the path 4 of the light beam are provided glass filters F colored yellow, purple and blue-green, which make it possible to suppress partially or entirely the primary colors blue, green and red, contained in the light beam, depending on the extent of insertion into the path of rays 4. For a partial swiveling of lever 1, 2 and 3 together with filters F into the path of rays 4 of the copy light, (i.e., for the execution of a primary filtering desired) for each rocking lever there is provided a push rod 8, 9 or 10 movable in the direction of arrow (f). One end of each of the push rods 8, 9 or 10 is in operating contact with the corresponding rocking lever 1, 2 or 3, while the ends of the push rods remote from the rocking levers cooperate with cam plates E, which may be turned by means of respective adjusting discs R. Each of the such adjusting discs R may advantageously be provided with a corresponding filter scale.

On each rocking lever 1, 2 and 3 is attached a spring element 11, 12 or 13, which serves to hold the appropriate rocking lever always in contact with the corresponding push rod 8, 9 or 10. Each axis of rotation 5, 6 and 7 is in operative engagement with rotary magnets or electromagnetic means M, which upon energization move the respective rocking levers against the action of springs 11, 12 or 13 in the direction of arrows $g$ in such a manner that filters F are fully inserted into the path 4 of the copy light, completely cover it and thus become effective as suppression filters.

FIG. 1 illustrates the rocking lever 1 with continuous lines in its resting position and with dotted lines in its suppression position 1.

Figure 2:
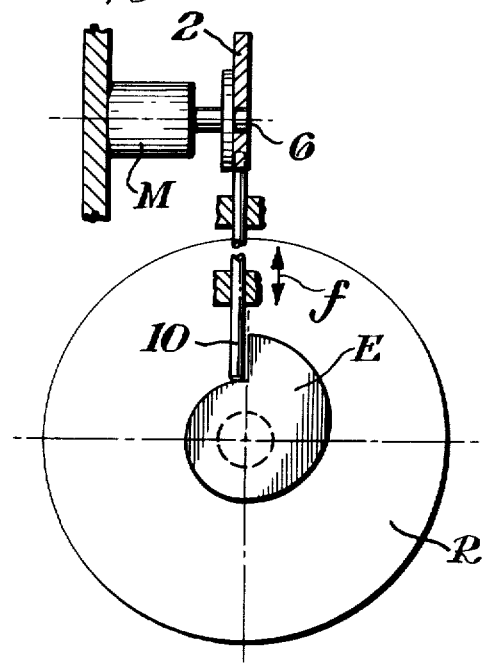
FIG. 2 is a cross-section along the lines 2—2 of FIG. 1.

FIG. 2 illustrates the construction of the adjusting device for the primary filtering as well as the arrangement of the rotary magnet. The push rod 10, being in operating contact with rocking lever 2, arranged to turn about axis 6 of the rotary magnet M, is moved in the direction of arrow $f$ with the rotating of the adjusting disk R and thus of cam E, whereby a more or less extensive pivoted insertion of the filter (not illustrated) arranged on lever 2 takes place. If a suppression of a certain primary color contained in the light beam is desired, a complete pivotal insertion of the respective filter may be undertaken by the activation of rotary magnet M.

Upon a completed exposure of the individual photosensitive layers of the copy material, all rocking levers 1, 2 and 3 are returned by the corresponding return springs 11, 12, and 13 into their starting positions determined by push rods 8, 9 and 10, by activiation of rotary magnets M.

Figure 3:
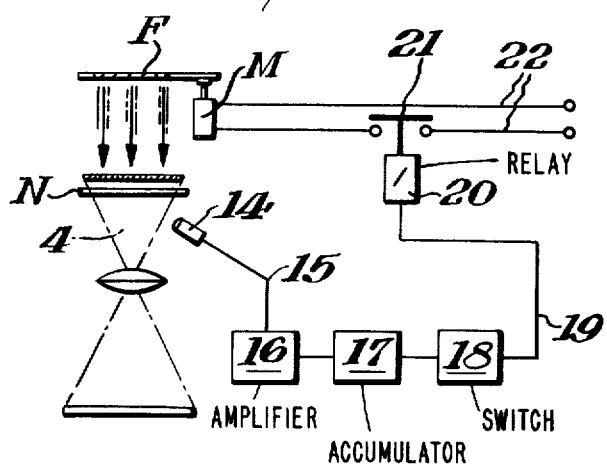
FIG. 3 is a simplified electric circuit diagram for the control of a suppression filter pertaining to a particular color for use in conjunction with the embodiment shown in FIGS. 1 and 2.

FIG. 3 illustrates schematically a control device for the activation of a respective rocking lever. For each filter for the primary colors contained in the light, there is a special control arrangement, essentially having the following construction:

In a direct proximity to the light beam 4, following to the color negative N to be copied, there is provided a photoelectric unit 14 pertaining to a certain primary color, which measures the intensity of the light of the respective color and, depending on the stated intensity, emits an electrical signal which is transmitted to an amplifier 16 by means of lead 15.

The output of amplifier 16 is in contact with the input of an accumulator 17 in which a capacitor, for example, is provided, which is charged. The more light of a certain primary color falls through the negative N, the more quickly is the capacitor charged in accumulator 17. Upon achieving a certain potential, switch 18, e.g., an electronic limit value switch, attached at the output of accumulator 17 is tripped activating by means of lead 10 a relay 20, which closes a switch 21 and thus provides the current supply to the rotary magnet M by means of leads 22. The rotary magnet M is thus energized and the rocking lever supporting a filter F is completely inserted into the path of rays of light beam 4 in order to suppress a certain primary color. The control circuits provided for the remaining two primary colors operate in a corresponding manner.

In order to undertake with the novel device a primary filtering of light beam 4, for the equalization of the irregularities in the individual photo layers, as well as the irregularities in the optical media, it is sufficient to adjust the rocking levers 1, 2 or 3 with the respective filters F by means of the respective mechanism consisting of push rod, cam plate and adjusting disc with the help of filter scales. There exists the possibility thus to withhold certain portions of the primary colors blue, green and red contained in the light beam 4. In an advantageous manner, the partially filtered light beam 4 is conducted through a diffusing plate as well as a reflecting compartment connected thereto, at the outlet of which there is situated a further diffusing plate in order to obtain a uniformly mixed light at the outlet surface of the color head. Since the stated units are assumed to be known, their illustration was omitted.

During the actual exposure of the photosensitive material after sufficient exposure has occurred (which is monitored by the photoelectric units as well as by the control circuit illustrated in FIGS. 3) actuation of the respective rocking levers occurs by means of the rotary magnets, whereby the respective filters are inserted completely into the path 4 of the light beam and thus a complete suppression of the respective light colors is accomplished.

After a complete exposure of all three photosensitive layers, the current supply to the individual rotary magnets M is interrupted, whereupon rocking levers 1, 2 and 3 are returned by means of the respective return springs 11, 12 and 13 into their starting position, which is determined by push rods 8, 9 and 10 and corresponds to the primary filtering in the enlarging apparatus.

I claim:

1. A process for prefiltering and exposure interruption in enlargers for copying color photographs by exposure to copying light emanating rays in a path, comprising the steps of partially inserting color filters relating to the three primary colors into the path of rays of the copying light into a position in which a desired degree of primary filtering is achieved for exposure of the light sensitive sheet material, securing said color filters in said position, obtaining sufficient exposure of the light sensitive layer pertaining to the particular primary colors, then inserting the respective filters for said particular primary colors for which sufficient exposure has been obtained completely into the path of said rays of said light for terminating the exposure of said layers for said primary colors, and returning all said color filters to their starting positions corresponding to said desired degree of primary filtering after the exposure of all of said light sensitive layers is completed.

2. A filter arrangement for a light sensitive sheet material having layers sensitive to particular primary colors comprising three color filters of the primary colors, said color filters being mounted on movable supports for insertion individually into the path of rays of the copying light, adjustable thrust means disposed in operative contact with said movable supports for regulating the partial insertion of said color filters into the path of rays of the light beam whereby a desired degree of primary filtering is accomplished, overdrive means on said color filters whereby said color filters are inserted fully into the path of said rays of said light beam whereby the exposure of respective colors in said light beam are terminated, and return means reacting against said movable supports for returning them in contact with said adjustable thrust means after the exposure to all the primary colors is completed.

3. The filter arrangement of claim 2 wherein said movable supports comprise spring loaded rocking levers rotatably mounted about a point of rotation, said adjustable thrust means for the setting of the primary filtering position comprising longitudinally movable push rods mounted in a plane disposed normal to the path of the rays, and each of said push rods being disposed in operating contact with a cam plate, and said cam plates being rotatably by respective adjusting elements.

4. The filter arrangement of claim 3, wherein said return means comprise spring units attached to said rocking levers and said spring units being constructed and arranged for urging said rocking levers towards their rest positions set by said longitudinally movable push rods.

5. The filter arrangement of claim 3, wherein each of said adjusting elements provided for the turning of said cam plates are calibrated in accordance with a filter scale.

6. The filter arrangement of claim 2, wherein said overdrive means comprises electric motor means.

7. The filter arrangement of claim 6, wherein said electric motor means each comprises a rotary magnet.

8. The filter arrangement of claim 6, wherein a control circuit is connected to each of said overdrives and said control means being constructed and arranged to be actuated upon transmission of the quantity of light required for a satisfactory exposure of the respective photosensitive layer on the copy material for the respective primary color.

9. The filter arrangement of claim 8, wherein each of said control circuits comprises a photoelectric unit for measuring the light intensity of the respective primary color, the electrical signal dependent on the light intensity of said photoelectric units being applied at the input of an amplifier, the output of said amplifier being connected to an accumulator which in turn is connected with an electronic limit value switch, said limit value switch being connected to a relay whereby upon reaching a predetermined value corresponding to the transmitted quantity of light of the primary color said relay is actuated to energize said electric motor for said overdrive.

10. The filter arrangement of claim 9, wherein that for each of the basic colors to be filtered, respective control circuits are provided for controlling the respective electric motors.

* * * * *